United States Patent
Takagi

(10) Patent No.: US 8,259,148 B2
(45) Date of Patent: Sep. 4, 2012

(54) IMAGE FORMING APPARATUS

(75) Inventor: Mutsumi Takagi, Hachioji (JP)

(73) Assignee: Konica Minolta Business Technologies, Inc., Chiyoda-Ku, Tokyo (JP)

(*) Notice: Subject to any disclaimer, the term of this patent is extended or adjusted under 35 U.S.C. 154(b) by 400 days.

(21) Appl. No.: 12/727,319

(22) Filed: Mar. 19, 2010

(65) Prior Publication Data

US 2010/0238423 A1 Sep. 23, 2010

(30) Foreign Application Priority Data

Mar. 23, 2009 (JP) ................................. 2009-069596

(51) Int. Cl.
*B41J 2/435* (2006.01)
*B41J 2/47* (2006.01)

(52) U.S. Cl. ........ 347/249; 347/248; 347/250; 347/234; 347/235

(58) Field of Classification Search .......... 347/234–235, 347/248–250
See application file for complete search history.

(56) References Cited

U.S. PATENT DOCUMENTS 7,287,700 B2 * 10/2007 Takaki et al. ............ 235/462.42
2005/0190420 A1 * 9/2005 Imai et al. ..................... 359/210

FOREIGN PATENT DOCUMENTS

JP 2006-305874 A 11/2006

* cited by examiner

*Primary Examiner* — Stephen Meier
*Assistant Examiner* — Sarah Al Hashimi
(74) *Attorney, Agent, or Firm* — Buchanan Ingersoll & Rooney PC

(57) ABSTRACT

A measuring section that measures the position shift in the main scanning direction of a plurality of light sources, a signal generating section that generates synchronized INDEX signals that in which the writing timing of the different light sources has been adjusted according to the position shifts, a signal generating section that generates the signals for driving the light sources based on the synchronized INDEX signals and image data, and a measuring section that detects the timing shift component in the main scanning direction included in the synchronized INDEX signal generated in the condition in which adjustments have been made according to the position shift, and further shift correction is carried out in the main scanning direction based on the timing shift component, for the synchronized INDEX signal which are adjusted and generated in accordance with the position shift of a plurality of light sources.

8 Claims, 5 Drawing Sheets

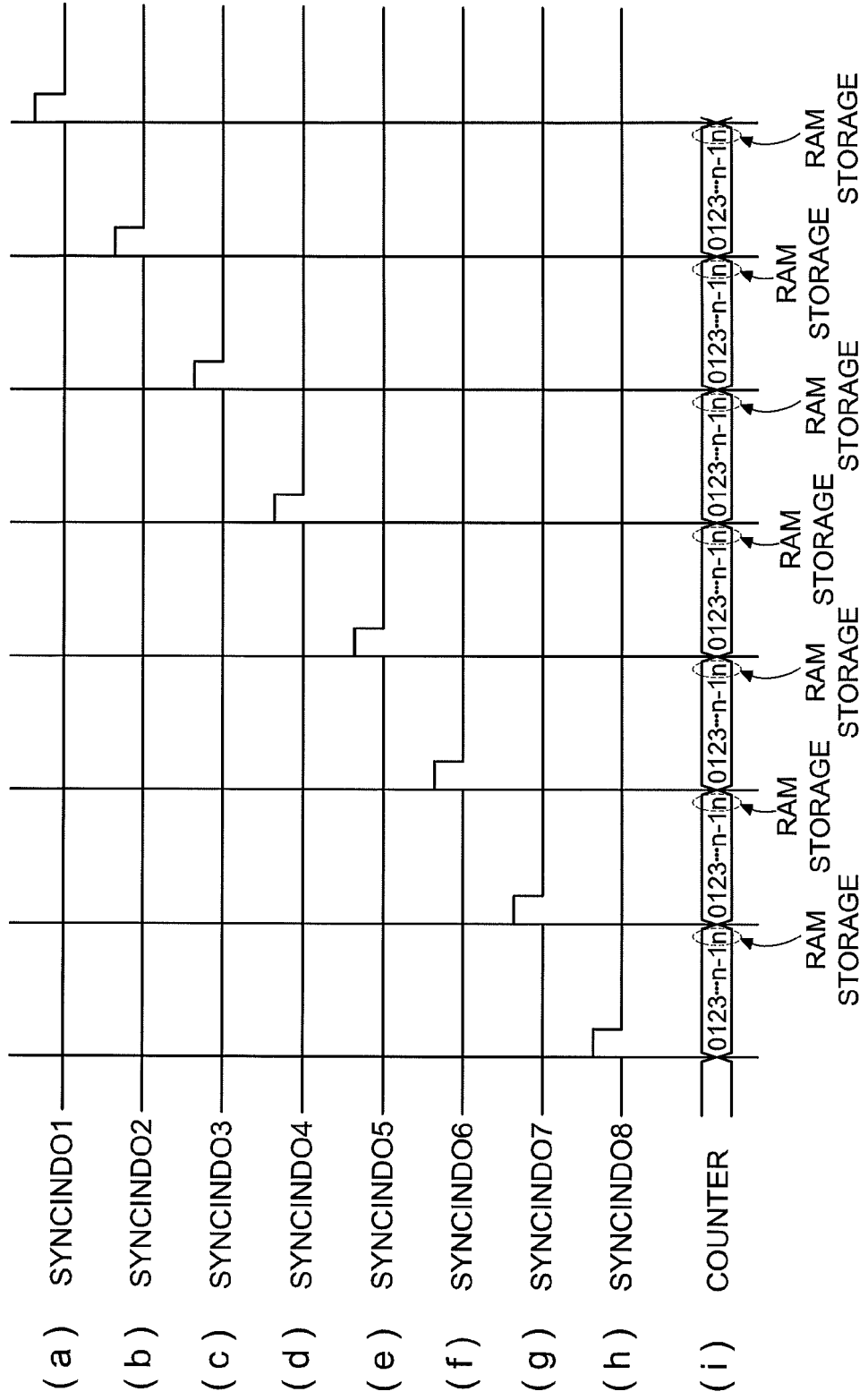

IMAGE FORMING APPARATUS

This application is based on Japanese Patent Application No. 2009-069596 filed on Mar. 23, 2009 with Japanese Patent Office, the entire content of which is hereby incorporated by reference.

BACKGROUND OF THE INVENTION

The present invention relates to image forming apparatuses that can carry out accurate exposure by correcting various types of shifts that could not be corrected by merely correcting the physical position shifts of a plurality of light sources.

In recent years, since higher speed and higher density of writing are expected of image forming apparatuses, a plurality of lines are being written simultaneously using multiple beams.

In this case, a laser diode (LD) array 140AL in which a plurality of light emitting sections are formed integrally as is shown in FIG. 2a is used as an exposure section 140. Further, this exposure section is sometimes not placed vertical to the main scanning direction (placement along the auxiliary scanning direction: FIG. 2a), but is used by placing it in an inclined manner with respect to the auxiliary scanning direction as is shown in FIG. 2b.

Because of this inclined placement of the exposure section, the intervals in the auxiliary scanning direction of the plurality of lines formed along the main scanning direction become narrower, and high density is realized in the auxiliary scanning direction.

In this case, since position shift occurs physically in the main scanning direction as is shown in FIG. 2b, it is necessary, as is shown in FIG. 3, to carry out writing after adjusting the position of starting the writing for each beam, and correcting the position shift due to inclined placement.

As a method of correcting shift in inclined placement of such LD array 140AL, it is possible to measure the spacing between neighboring LDs in the main scanning direction by allowing the LD which is the target of measurement to emit light and measuring the distance of the shift in the main scanning direction using a photo sensor. Further, by reflecting the amount of shift obtained from the measurement result in the timing of generation of the main scanning direction reference signal (INDEX) or in the phase adjustment of the pixel clock, aligning of the starting position of writing of multiple beams can be carried out.

Further, regarding the shift correction of multiple beams when the LD array is placed in an oblique manner, a proposal has been made in the following Unexamined Japanese Patent Application Publication No. 2006-305874.

In the prior art of the above Unexamined Japanese Patent Application Publication No. 2006-305874, the shift in the main scanning direction of a plurality of LDs (two LDs among these) is detected and corrected electrically. Here, the measurement target is the SIND signal which is made from the INDEX signal generated by receiving the light of the LD beam by the INDEX sensor and is made by synchronizing the INDEX signal with the pixel clock.

Further, the reference LD used for light reception of the INDEX sensor is changed, and SIND signals are generated such as SIND1 for a certain line and SIND2 for the next line. In addition, the interval from SIND1 to SIND2 (the length of approximately one line) is measured by a counter. Because of this, the correction value obtained by measurement is reflected in the writing CLK correcting section (delay line) of each of the LDs, the INDEX generation timing, or in the H-Valid generating section.

However, in the above correction method, the inventors of the present invention found out that, in spite of carrying out correction of the starting position of writing by executing adjustment by carrying out pixel clock phase adjustment using a delay device and a PLL or by changing the timing of generating the INDEX signal, fluctuations are generated in the starting position of writing.

This is because, even if the position shift is detected by measuring the LD position using a photo sensor, this is merely grasping the amount of position shift in the physical position of the LD and carrying out correction based on that amount of position shift.

In addition, the range for setting in which the actual LD position shift correction is reflected is within the range of the processing circuit that carries out adjustment of the pixel clock phase adjusting section, and the pixel clock output after the phase adjustment has been carried out is outside the range of correction.

When fluctuations in the electrical characteristics (electrical shifts) occur in the delay devices or PLL incorporated in the pixel clock phase adjusting section, or when shifts occur relative to the assumed values in the power supply voltage or temperature of circuit elements, since there is no means for detecting the amount of shift newly caused by those parts, variations remain in the actual starting position of writing, and pixel shifts occur in the main scanning direction.

Further, due to the oblique placement of LD arrays for higher densities as explained above, there is a big problem that the image quality of the image forming apparatus decreases.

Further, at the present point in time, in apparatuses such as image forming apparatuses using oblique placement of LD arrays, technologies made by considering the above problem, or effective methods for solving the above problem did not exist.

The present invention solves the above problems, and an object of the present invention is to realize an image forming apparatus in which it is possible to generate accurate signals in a condition in which the residual shift components are eliminated that are generated due to variations in various electrical characteristics present in signal generating sections or the like, that generate synchronized signals according to the physical shifts of a plurality of light sources.

SUMMARY

The preferred embodiments of the present invention that solve the problems described above are as described below.

(1) An image forming apparatus provided with an exposure section having a plurality of light sources, a light source position shift measuring section that measures the position shifts in the main scanning direction of said plurality of light sources from the light reception signals at the time that said plurality of light sources are made to emit light at prescribed timing, a synchronized INDEX signal generating section that generates synchronized INDEX signals in which the writing timing of each of said plurality of light sources has been adjusted according to said position shifts, a light source driving signal generating section that generates the light source driving signals based on said synchronized INDEX signals and image data, and a timing shift measuring section that detects the timing shift components in the main scanning direction that are present in the synchronized INDEX signals generated in said synchronized INDEX signal generating section in the condition in which adjustments have been made in accordance with said position shills, with said image forming apparatus having the feature that, said synchronized INDEX signal generating section carries out, for said synchronized INDEX signals that are generated in said synchronized INDEX signal generating section by being adjusted according to said position shifts of said plurality of light sources, further shift correction in the main scanning direction based on said timing shift components.

(2) An image forming apparatus provided with an exposure section having a plurality of light sources, a light source position shift measuring section that measures the position shifts in the main scanning direction of said plurality of light sources from the light reception signals at the time that said plurality of light sources are made to emit light at prescribed timing, a synchronized INDEX signal generating section that generates synchronized INDEX signals in which the writing timing of each of said plurality of light sources has been adjusted according to said position shifts, a light source driving signal generating section that generates the light source driving signals based on said synchronized INDEX signals and image data, and a timing shift measuring section that detects the timing shift components in the main scanning direction that are present in the synchronized INDEX signals generated in said synchronized INDEX signal generating section in the condition in which adjustments have been made in accordance with said position shifts, with said image forming apparatus having the feature that, said synchronized INDEX signal generating section carries out, for said synchronized INDEX signals that are generated in said synchronized INDEX signal generating section by being adjusted according to said position shifts of said plurality of light sources, further shift correction in the main scanning direction based on said timing shift components, and for said synchronized INDEX signals which are generated by being adjusted by said position shifts and also corrected based on said timing shift components, repeats the shift correction in the main scanning direction based on the timing shift component that is additionally detected by said timing shift measuring section.

(3) An image forming apparatus according to (1) or (2) above wherein said exposure section is an array light source in which a plurality of light sources have been formed integrally, said array light source is arranged so that it is oblique relative to a direction perpendicular to the main scanning direction, and position shifts of said plurality of light sources occur due to said obliqueness.

BRIEF DESCRIPTION OF THE DRAWINGS

FIG. 5 is a time chart showing the operation of the preferred embodiments of the present invention.

DETAILED DESCRIPTION OF THE PREFERRED EMBODIMENTS

Figure 1:
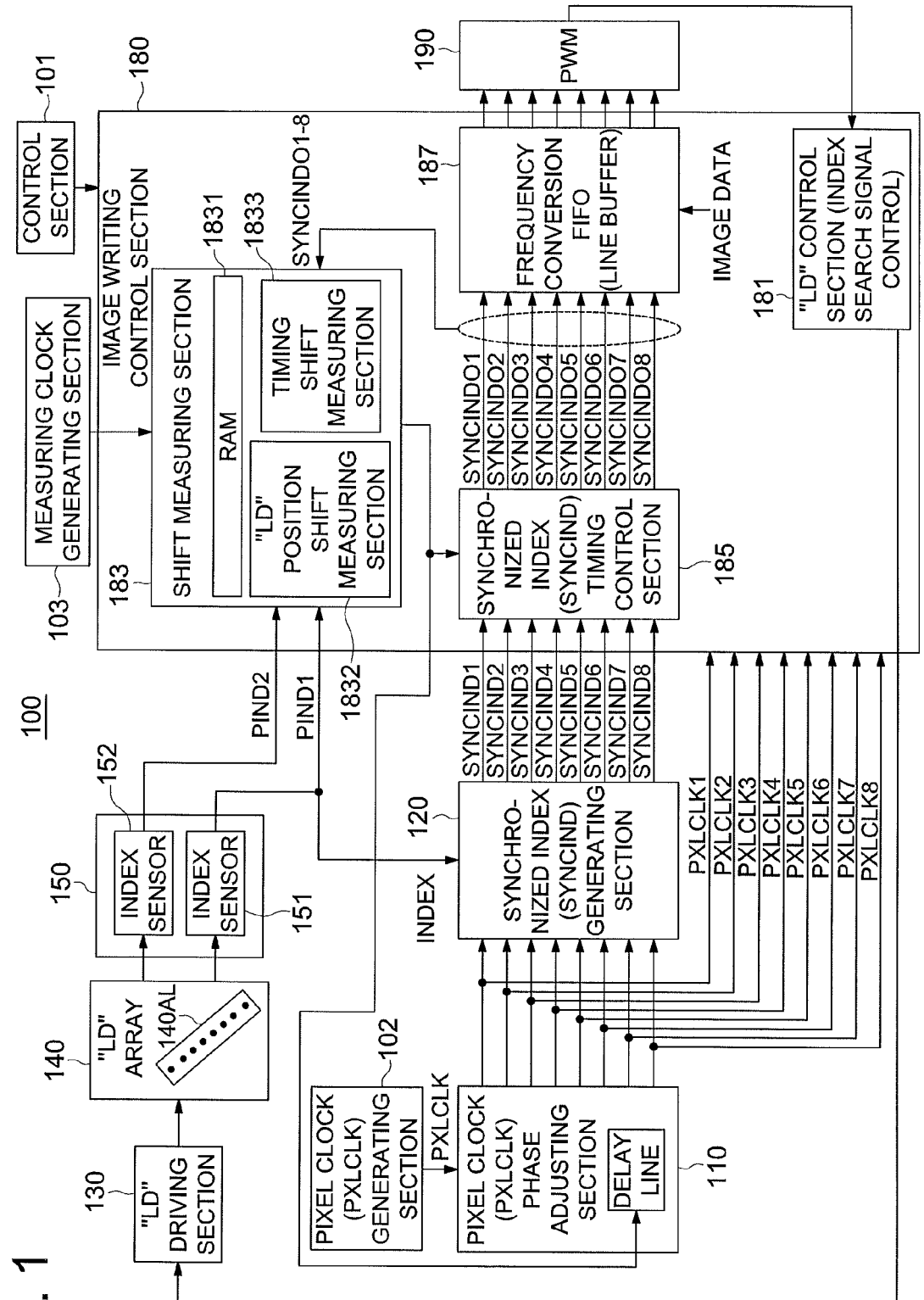
FIG. 1 is configuration diagram showing an outline configuration of a preferred embodiment of the present invention.

Some preferred embodiments of an image forming apparatus according to the present invention are described in detail in the following while referring to the drawings.

[Configuration of an Image Forming Apparatus 100]

Here, the configuration of an image forming apparatus 100 of the first preferred embodiment is described in details based on FIG. 1 (block diagram).

Here, as an example of a preferred embodiment, the case is described in which an 8 beams/chip laser diode (LD) array 140AL is being adopted as the exposure section 140, and their arrangement is made, not in a direction perpendicular to the main scanning direction (in the auxiliary scanning direction) but in a direction that is inclined at a prescribed angle from the auxiliary scanning direction, so that eight lines are written simultaneously in a multiple beam configuration. Further, the explanations of the polygon mirror that makes the multiple beams scan from the exposure section 140 in the main scanning direction, or of the mechanical parts such as the photoreceptor on which the writing is done or the like are omitted because various types of equipment are already well known.

The control section 101 is constituted using a CPU and controls the different parts in accordance with the control programs.

The pixel clock generating section generates the pixel clock (PXLCLK) which is the basis for various types of signals such as the synchronized signals.

The measuring clock generating section 103, in order to measure the shift components of the synchronized signals, generates a measuring clock with a frequency higher than that of the pixel clock.

The pixel clock phase adjusting section 110 receives input of the pixel clock, and using a built-in delay line, generates the pixel clocks in a condition in which the writing timing of each light source has been adjusted according to the position shift of the oblique arrangement of the LD array.

The synchronized INDEX signal generating section 120 receives the INDEX signal generated by the INDEX sensor 150, and generates the synchronized INDEX signal SYNC-IND which is a pixel clock in the condition in which it is synchronized with that INDEX signal.

The LD driving section 130 allows the different light emitting sections of the LD any of the exposure section 140 to emit light due to the light source driving signals to be described later.

The exposure section 140 is constituted by an LD array with a plurality of light sources which are placed not perpendicular to the main scanning direction but at an angle to it, and simultaneous writing is carried out using multiple beams.

The INDEX sensor 150 is constituted by plural sensors such as an INDEX sensor 151 and an INDEX sensor 152, and detects the position shift of the light sources of the exposure section 140.

The image writing control section 180 is configured to have an LD control section 181, a shift measuring section 183, a synchronized INDEX timing control section 185, and a frequency conversion FIFO 187, in order to carry out detection of the position shifts of the plurality of light sources of the exposure section 140, to carry out detections of the timing shifts that are not eliminated even after adjustments are made based on the position shifts, and to carry out shift corrections according to these shifts.

Further, inside the shift measuring section 183 are placed a RAM 1831, an LD position shift measuring section 1832, and a timing shift measuring section 1833.

The PWM section 190 is a converting section that converts into a PWM signal the frequency converted signal that has been subjected to frequency conversion according to the image data after corrections for position shifts and timing shifts.

Further, the INDEX sensor 150 and the LD position shift measuring section 1832 configure the light source position shift measuring section of the claims. In addition, the pixel clock phase adjusting section 110, the synchronized INDEX signal generating section 120, and the synchronized INDEX timing control section 185 configure the synchronized INDEX signal generating section of the claims. Furthermore, the frequency conversion FIFO 187 and the PWM section 190 configure the light source driving signal generating section in the claims. Also, the timing shift measuring section 1833 configures the timing shift measuring section of the claims.

Here, for the LD1 to LD8 of the LD array of the exposure section 140, any one of the eight LDs (for example, LD8) is taken as the reference, the light beam emitted by the reference LD is received by the INDEX sensor 151, and the INDEX signal is generated which is the main scanning direction reference signal.

Since the INDEX signal generated at this time is not synchronized with the pixel clock (PXLCLK) which is the clock for writing image data, it is necessary to generate a synchronized INDEX signal SYNCIND that is synchronized with the PXLCLK.

The pixel clock PXLCLK and the synchronized INDEX signal SYNCIND are prepared for each of the light emissions from the LD array. For example, in the present preferred embodiment, PXLCLK1 to PXLCLK8 and SYNCIND1 to SYNCIND8 are generated. Further, while PXLCLK1 to PXLCLK8 are different clock (CLK) signals because CLK phase adjustments are made, they all are of the same frequency.

In the writing control section 180 that carries out control at the time of actually writing the image data is provided with a FIFO 187 for frequency conversion for a connection of the image processing section ⇔ writing control section.

By adjusting the timing of the synchronized INDEX signal SYNCIND, position adjustment is carried out in units of one pixel clock PXLCLK (=in units of 1 pixel) thereby SYNCINDO is generated, and taking SYNCINDO as the reference signal, reading out from the FIFO is started using the frequency conversion FIFO 187.

Further, position adjustments of less than one pixel are carried out, in the pixel clock phase adjusting section 110, by finely adjusting the phase of the pixel clock by an amount less than a pixel. In the PXLCLK phase adjusting section, the CLK phase is adjusted using a delay line made of delay devices.

[Operation of the Image Forming Apparatus 100]

Figure 2A:
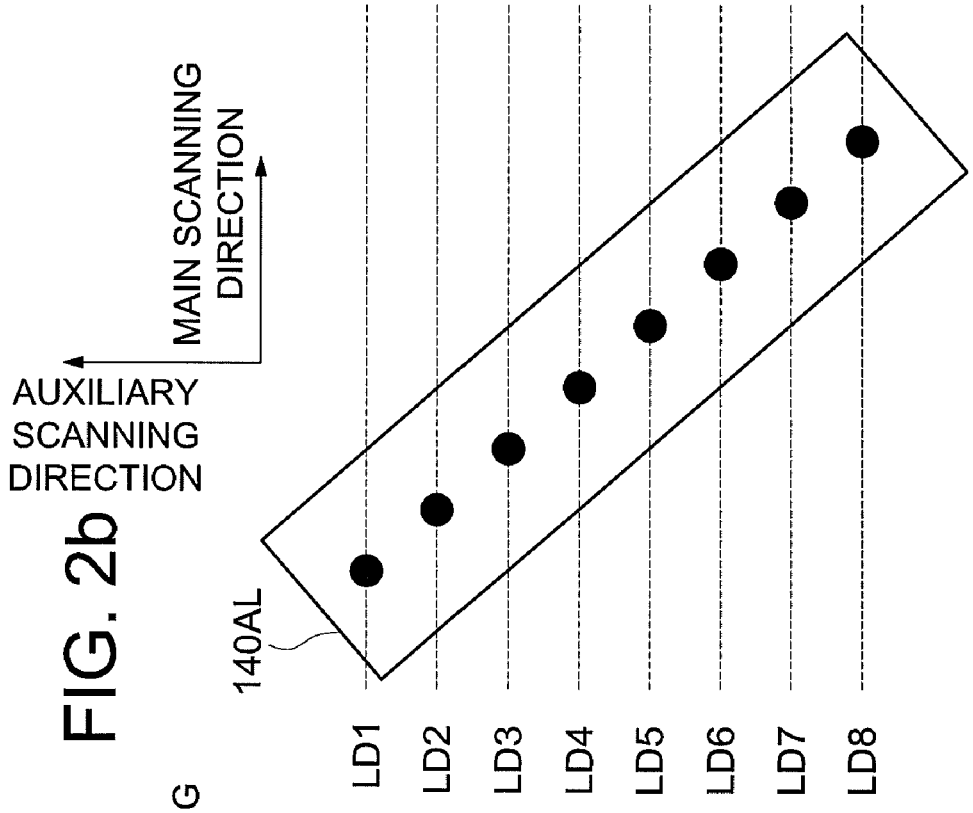
FIG. 2a and FIG. 2b are explanatory diagrams explaining the preferred embodiments of the present invention.

In the following, the timing adjustment operation of an image forming apparatus 100 according to the present preferred embodiment is described referring to the explanatory diagrams of FIG. 2a, FIG. 2b, and FIG. 3, the flow chart of FIG. 4, and the time chart of FIG. 5.

To begin with, explanation is given about the correction of physical position shifts of the obliquely arranged laser diodes LD1 to LD8 of the exposure section 140.

Figure 2B:
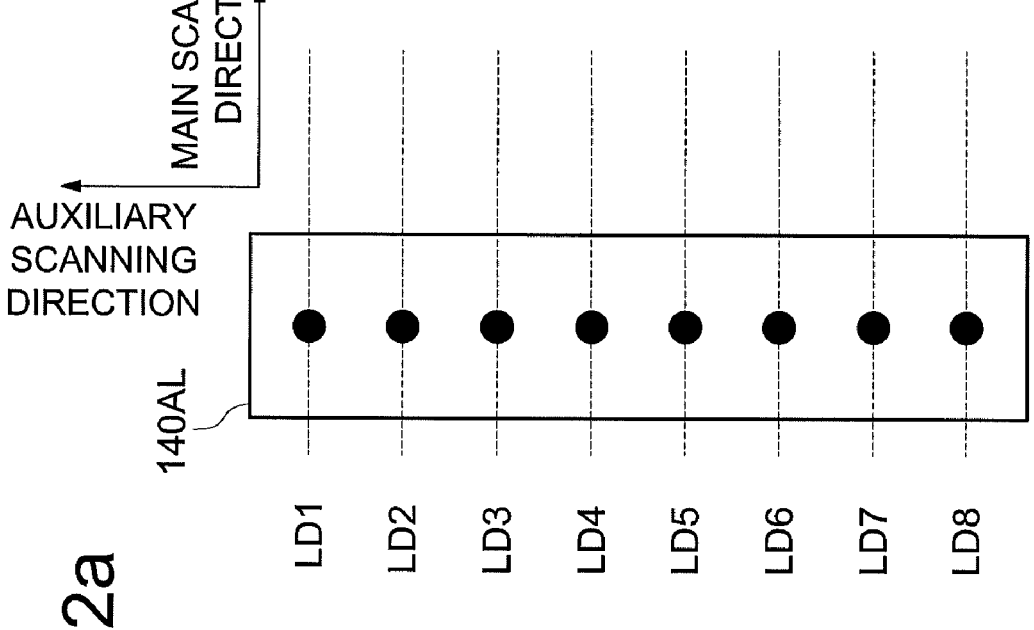
Figure 3:
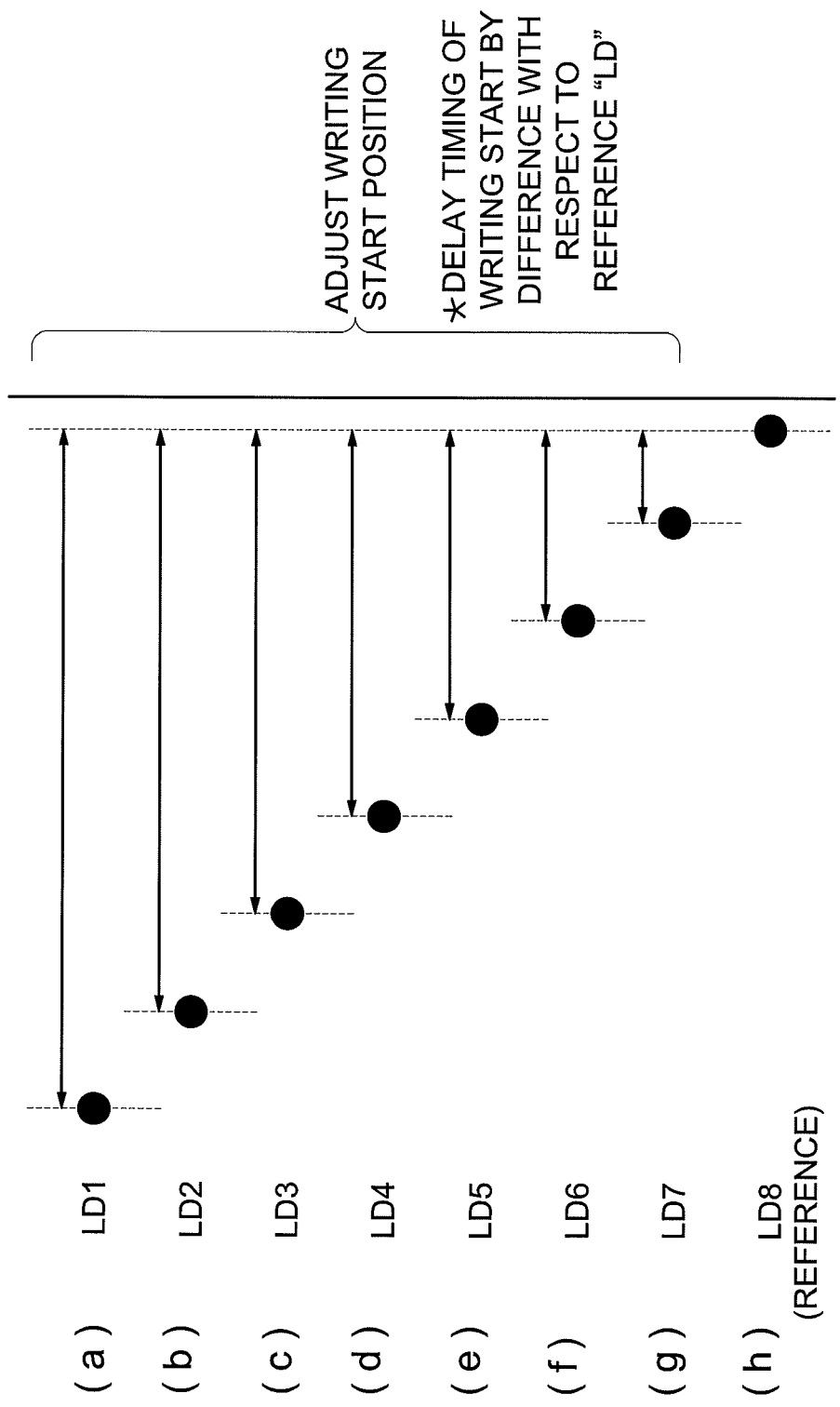
FIG. 3 is an explanatory diagram explaining the preferred embodiments of the present invention.

In order to realize high densities in the auxiliary scanning direction, if the LD array of the exposure section 140 is placed obliquely, position shifts in the main scanning direction are generated of the laser diodes LD1 to LD8 (FIG. 2b).

Figure 4:
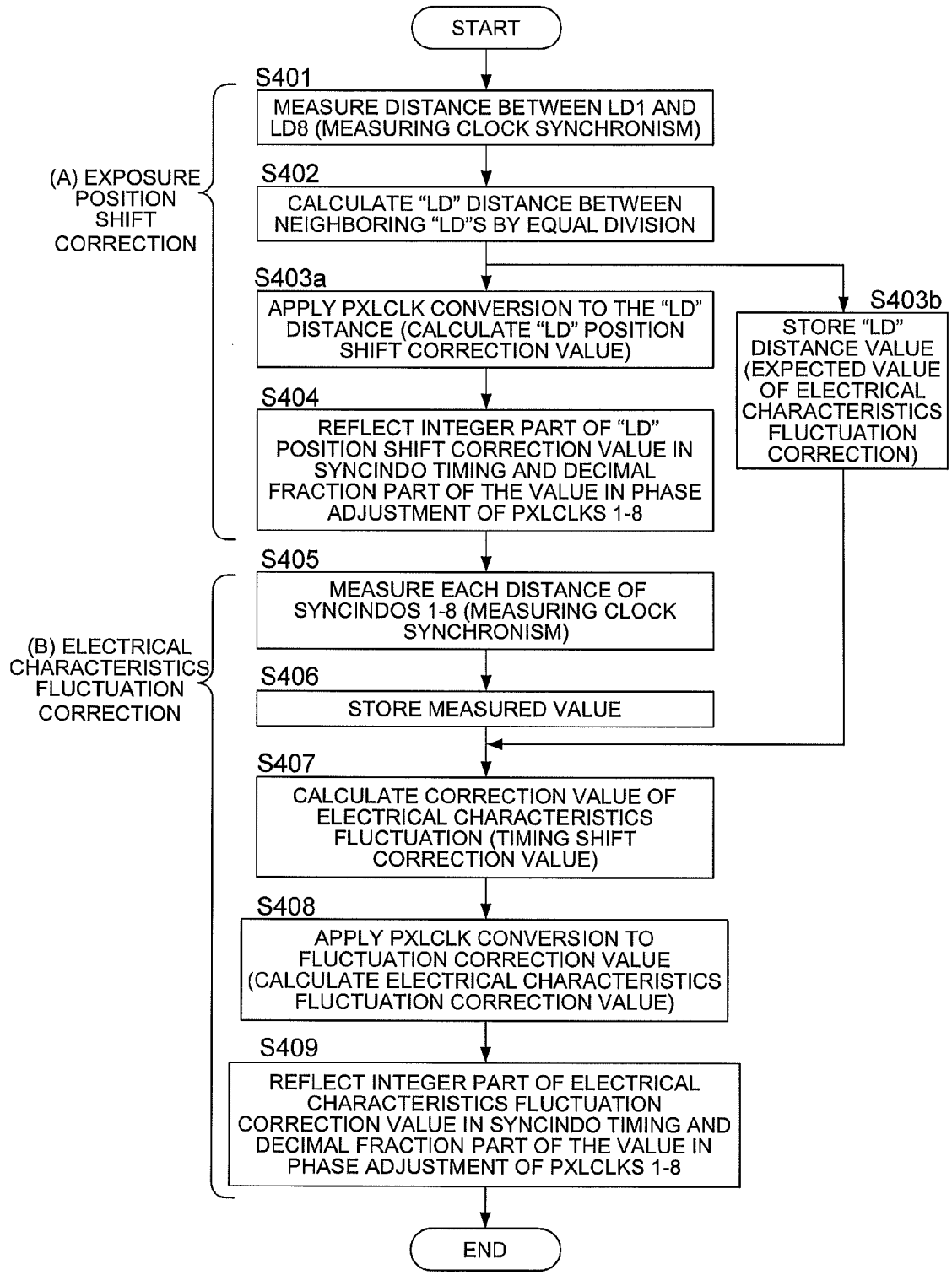
FIG. 4 is a flow chart showing the operation of the preferred embodiments of the present invention.

Here, since the LD array has eight laser diodes placed at equal intervals, the distance (the position shift) between LD1 and LD8 is measured by the LD position shift measuring section 1832 (Step S401 in FIG. 4), and by distributing it equally among the segments between neighboring laser diodes, it is possible to obtain the amounts of position shifts between each of pair of neighboring laser diodes (Step S402 in FIG. 4).

Here, in the measurement of the distance (the position shift) between LD1 and LD8, two INDEX sensors 151 and 152 (for outputting signals PIND1 and PIND2 respectively) are used.

At first, the two INDEX sensors 151 and 152 detect LD8 which has been stipulated as the reference LD, and the corresponding distance between outputted PIND1 and PIND2 is measured and taken as the reference value between INDEX sensors 151 and 152.

Next, PIND1 is outputted by detecting LD8 and PIND2 is outputted by detecting LD1, and the corresponding distance between PIND1-PIND2 of different LDs is measured. The CLK used for the measurement is a measuring CLK generated by the measuring clock generating section 103 and having a frequency higher than the PXLCLK.

The corresponding difference between the distance PIND1-PIND2 of different LDs and the corresponding distance PIND1-PIND2 of the same LD becomes the distance between LD1 and LD8.

The distance between LD1 and LD8 obtained by measurement is distributed equally among the segments (7 segments, since there are seven segments between neighboring laser diodes in a 1-chip 8-beam LD array), and the shift measuring section 183 calculates the amounts of corrections for the position shifts of each of the laser diodes LD (see FIG. 3) (Step S403a in FIG. 4).

Here, the shift measuring section 183, calculates the correction amounts by converting the correction amount in terms of the pixel clock PXLCLK, the integer part (=in units of 1 pixel) of the correction amount calculated for the laser diodes LD other than the reference laser diode LD8 is reflected in the SYNCINDO timing adjustment in the synchronized INDEX timing control section 185, and the fraction part (=less than 1 pixel) is reflected in the pixel clock PXLCLK phase adjustment of the pixel clock phase adjusting section 110 (Step S404 of FIG. 4).

In other words, in the pixel clock phase adjusting section 110, due to the fine differences in the delay time generated by delay lines, the desired phase adjustment of less than one pixel is carried out. In addition, in the synchronized INDEX timing control section 185, the desired phase adjustment in units of one pixel is carried out.

With the above, the LD position shift correction is completed. Because of this, the position shifts of starting the writing due to the shifts in the physical positions of LDs of the exposure section 140 are eliminated.

Next, after the physical position shifts of the LDs have been eliminated, timing correction is carried out for the fluctuations in the electrical characteristics (electrical shifts) of the pixel clock phase adjusting section 110.

In the above explanations, the causes of the "timing shifts" generated due to various types of factors such as fluctuations of power supply voltage and circuit elements, temperature variations are comprehensively called "electrical shifts" or "fluctuations in electrical characteristics", or the like.

The reading out reference signal of the image writing section. FIFO (SYNCINDO) in which the LD position shift correction amounts have been reflected, and which is synchronized with the PXLCLK after phase adjustment is taken as the target of measurement, and a timing shift measuring section 1833 is provided as a SYNCINDO measuring circuit that measures the respective intervals between SYNCINDO1 to SYNCINDO8.

By allowing the timing shift measuring section 1833 as a SYNCINDO measuring circuit to be a circuit for synchronizing with measuring clock having a higher speed than the pixel clock PXLCLK, similar to the physical shift measurement, measurements are made in units of less than one CLK period of the pixel clock PXLCLK (=less than one pixel). It is aimed to increase the precision of error detection.

Here, the SYNCINDO measurement and correction for fluctuations in electrical characteristics are described.

For the respective intervals of SYNCINDO1 to SYNCINDO8 ((a) to (h) in FIG. 5), the measurement is made using a counter circuit inside the measuring circuit in the timing shift measuring section 1833 ((i) in FIG. 5).

A counter synchronized to the measuring CLK (a higher speed CLK than the PXLCLK) is provided inside the measuring circuit in the timing shift measuring section 1833, and the counting is started upon receiving the input of SYNCINDO.

During the counting, the count value is stored in the count value storing section at the instant of time when the SYNCINDO is inputted again, and the counting itself is restarted after resetting.

The stored count value is stored inside the RAM 1831 in the shift measuring section (Step S406 in FIG. 4).

Since the timing of SYNCINDO input reflects the oblique placement correction of the LD array, starting from SYNCINDO of LD8 as the reference LD, the inputs are made successively to the measuring circuit in the shift measuring section 1833 in the sequence of SYNCINDO8→SYNCINDO7→SYNCINDO6→ . . . SYNCINDO2→SYNCINDO1.

The amount of fluctuations in the electrical characteristics is calculated based on the SYNCINDO intervals between neighboring LDs obtained by measurement (Step S407 in FIG. 4).

Here, the physical distance between neighboring LDs in the main scanning direction is obtained by dividing equally (into seven segments) the distance between LD1 and LD8 obtained during the correction for LD physical position shift.

This distance is taken as the expectation value of the SYNCINDO intervals between neighboring LDs (by using the same CLK as that for physical shift measurement (a faster CLK than the pixel clock PXLCLK), it becomes possible to prevent the errors generated by CLK conversions). If the obtained value is only the component due to physical position shift, it is equal to the expectation value.

However, in the actual correction for LD physical position shift (Step S403$a$ and Step S404 of FIG. 4), since various types of timing shifts are present such as fluctuations in the electrical characteristics of the delay devices in the PXLCLK phase adjusting section 110 that are outside the range of measurement and correction, there are differences generated with respect to the expectation value. This difference amount is the timing shift due to the fluctuations in the electrical characteristics (Step S403$b$ in FIG. 4) obtained by the measurement.

The correction value is calculated by converting the amount of fluctuations in the electrical characteristics to a value in terms of the pixel clock PXLCLK (Step S408 in FIG. 4).

Similar to correction of physical shift, the integer part of (=in units of 1 pixel) the correction amount is reflected in the SYNCINDO timing adjustment in the synchronized INDEX timing control section 185, and the fraction part (=less than 1 pixel) is reflected in the adjustment in the pixel clock phase adjusting section 110. Since the physical shift correction amount has already been reflected, the value set actually is the correction value for physical shift+the correction value for fluctuations in the electrical characteristics (Step S409 of FIG. 4).

Because of the above, it becomes possible to measure and correct the timing shifts due to various causes such as the fluctuations in the electrical characteristics of the pixel clock phase adjusting section 110 that could not be measured and corrected using the conventional technology, and the shift correction accuracy of the position of starting the writing increases.

In other words, a feature of the present preferred embodiments is that the shifts of the shift correcting section itself is measured and corrected, which could not be done by merely carrying out correction of the physical shift due to oblique arrangement of the LD array. The readout reference signal of the image writing section FIFO in which the LD position shift correction amounts have been reflected and which is synchronized with pixel clock after phase adjustment is taken as the target of measurement. Because jitter components in the shift correcting section are included, and also, since the LD position shift amount correction value is reflected, and the physical shift amount does not become a jitter component, it becomes possible to measure the electrical shifts.

Further, it is desirable to repeat successively the correction related to the above timing shift while the image forming apparatus is operating. In other words, in addition to physical shift correction, electrical timing correction is being carried out, and by repeating this electrical timing correction further, it is possible to eliminate residual shifts (electrical timing shifts that are generated newly).

When there is any change in the correction amount, it is desirable that actual applying of changes in the correction amount is carried out at a timing at which image formation is not being made between jobs since the effect on images is small.

According to the above preferred embodiment of the invention, for example, it is possible to obtain the following effects.

(1) At the time of measuring the position shift in the main scanning direction of a plurality of light sources from the light reception signal at the time of allowing a plurality of light sources to emit light at a prescribed timing, calculating the correction value that corrects the writing timing of a plurality of light sources according to the position shift, generating a synchronized INDEX signal in which the writing timings of the different light sources have been corrected according to the correction values, and carrying out writing by generating the light source driving signal based on the synchronized INDEX signal and the image data, the timing shift component in the main scanning direction is detected that is included in the synchronized INDEX signal generated in a condition in which adjustment has been made in accordance with the position shift, and further shift correction is carried out in the main scanning direction based on the timing shift component, for the synchronized INDEX signal which are generated after making adjustment in accordance with the correction value based on the position shift of a plurality of light sources.

Because of this, it is possible to generate accurate signals in a condition in which the residual shift components have been eliminated that are generated due to various types of fluctuations in electrical characteristics that remain in the signal generating section that generates a synchronized signal according to physical position shift of a plurality of light sources or the like.

(2) At the time of measuring the position shift in the main scanning direction of a plurality of light sources from the light reception signal at the time of allowing a plurality of light sources to emit light at a prescribed timing, calculating the correction value that corrects the writing timing of a plurality of light sources according to the position shift, generating a synchronized INDEX signal in which the writing timings of the different light sources have been corrected according to the correction values, and carrying out writing by generating the light source driving signal based on the synchronized INDEX signal and the image data, the timing shift component in the main scanning direction is detected that is included in the synchronized INDEX signal generated in a condition in which adjustment has been made in accordance with the position shift, and further shift correction is carried out in the main scanning direction based on the timing shift component, for the synchronized INDEX signal which are generated after making adjustment in accordance with the correction value based on the position shift of a plurality of light sources, and shift correction in the main scanning direction is repeated based on the timing shift components that are detected additionally, for the synchronized INDEX signal which are generated after making adjustment in accordance with the correction value and after making corrections based on timing shifts.

Because of this, it is possible to generate accurate signals in a condition in which the residual shift components have been eliminated that are generated due to various types of fluctuations in electrical characteristics that remain in the signal generating section that generates a synchronized signal according to physical position shift of a plurality of light sources, or the like.

(3) Further, in (1) or (2) above, an array light source in which a plurality of light sources are formed integrally is used, said array light source is placed inclined with respect to a direction perpendicular to the main scanning direction, thereby aiming to achieve high density in a direction perpendicular to the main scanning direction (the auxiliary scanning direction). Further, the position shift among the plurality of light sources generated due to that obliqueness is eliminated using the method in (1) or (2) above. In addition, even for the timing shift component that is not eliminated by eliminating these position shifts, their elimination is carried out using the method in (1) or (2) above.

What is claimed is:

1. An image forming apparatus comprising:
an exposure section having a plurality of light sources;
a light source position shift measuring section which measures a position shift of the plurality of light sources in a main scanning direction by using light reception signals when the plurality of light sources are made to emit light at prescribed timing;
a synchronized INDEX signal generating section which generates synchronized INDEX signals in which writing timing of each of the plurality of light sources has been adjusted according to the position shift;
a light source driving signal generating section which generates light source driving signals based on the synchronized INDEX signals and image data; and
a timing shift measuring section which detects a timing shift component in the main scanning direction which is included in the synchronized INDEX signals generated in the synchronized INDEX signal generating section in a condition in which the synchronized INDEX signals have been adjusted in accordance with the position shift,
wherein the synchronized INDEX signal generating section carries out further shift correction in the main scanning direction based on the timing shift component, for the synchronized INDEX signals which are generated in the synchronized INDEX signal generating section by being adjusted according to the position shift of the plurality of light sources.

2. The image forming apparatus of claim 1,
wherein the synchronized INDEX signal generating section repeats the shift correction in the main scanning direction based on the timing shift component which has been additionally detected by the timing shift measuring section, for the synchronized INDEX signals which are generated by being adjusted according to the position shift and corrected based on the timing shift component.

3. The image forming apparatus of claim 1,
wherein the exposure section is an array light source in which the plurality of light sources are arrayed and formed integrally, and the array light source is arranged obliquely relative to a direction perpendicular to the main scanning direction, and then the position shift of the plurality of light sources occurs due to the obliqueness.

4. The image forming apparatus of claim 2,
wherein the exposure section is an array light source in which the plurality of light sources are arrayed and formed integrally, and the array light source is arranged obliquely relative to a direction perpendicular to the main scanning direction, and then the position shift of the plurality of light sources occurs due to the obliqueness.

5. An image forming method for an image forming apparatus including an exposure section having a plurality of light sources, the method comprising the steps of
measuring a position shift of the plurality of light sources in a main scanning direction by using a light reception signals when the plurality of light sources are made to emit light at prescribed timing;
generating synchronized INDEX signals in which writing timing of each of the plurality of light sources has been adjusted according to the position shift;
generating light source driving signals based on the synchronized INDEX signals and image data; and
detecting a timing shift component in the main scanning direction which is included in the synchronized INDEX signals generated in the step of generating synchronized INDEX signals in a condition in which the synchronized INDEX signals have been adjusted in accordance with the position shift,
carrying out further shift correction in the main scanning direction based on the timing shift component, for the synchronized INDEX signals which are generated in the step of generating synchronized INDEX signals by being adjusted according to the position shift of the plurality of light sources.

6. The image forming method of claim 5, further comprising:
repeating the shift correction in the main scanning direction based on the timing shift component which has been additionally detected in the detecting step, for the synchronized INDEX signals which are generated by being adjusted according to the position shift and corrected based on the timing shift component.

7. The image forming method of claim 5,
wherein the exposure section is an array light source in which the plurality of light sources are arrayed and formed integrally, and the array light source is arranged obliquely relative to a direction perpendicular to the main scanning direction, and then the position shift of the plurality of light sources occurs due to the obliqueness.

8. The image forming method of claim 6,
wherein the exposure section is an array light source in which the plurality of light sources are arrayed and formed integrally, and the array light source is arranged obliquely relative to a direction perpendicular to the main scanning direction, and then the position shift of the plurality of light sources occurs due to the obliqueness.

* * * * *